(12) United States Patent
Hoffmann et al.

(10) Patent No.: US 12,297,812 B2
(45) Date of Patent: May 13, 2025

(54) SYSTEM AND METHOD FOR REDUCING FARM-LEVEL POWER OSCILLATIONS IN THE GRID INDUCED BY A WIND FARM

(71) Applicant: General Electric Renovables Espana, S.L., Barcelona (ES)

(72) Inventors: Till Hoffmann, Osnabrueck (DE); Werner Gerhard Barton, Gescher (DE); Enno Ubben, Steinfurt (DE)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/547,571

(22) PCT Filed: Feb. 26, 2021

(86) PCT No.: PCT/IB2021/051645
§ 371 (c)(1),
(2) Date: Aug. 23, 2023

(87) PCT Pub. No.: WO2022/180432
PCT Pub. Date: Sep. 1, 2022

(65) Prior Publication Data
US 2024/0301865 A1    Sep. 12, 2024

(51) Int. Cl.
*F03D 7/04* (2006.01)
*F03D 7/02* (2006.01)
(52) U.S. Cl.
CPC .......... *F03D 7/048* (2013.01); *F03D 7/0284* (2013.01); *F05B 2270/32* (2013.01); *F05B 2270/335* (2013.01)

(58) Field of Classification Search
CPC .... F03D 7/048; F03D 7/0284; F05B 2270/32; F05B 2270/335
See application file for complete search history.

(56) References Cited

U.S. PATENT DOCUMENTS

| | | |
|---|---|---|
| 9,397,599 B2 | 7/2016 | Letas |
| 2013/0207393 A1* | 8/2013 | Letas ................... H02J 3/1842 290/44 |

(Continued)

FOREIGN PATENT DOCUMENTS

WO    WO2013/110691 A2    8/2013

OTHER PUBLICATIONS

PCT International Search Report & Opinion Corresponding to PCT/IB2021/051645 on Nov. 25, 2021.

*Primary Examiner* — Viet P Nguyen
(74) *Attorney, Agent, or Firm* — Dority & Manning, P.A.

(57) ABSTRACT

A method for controlling a wind farm having a plurality of wind turbines electrically connected to an electrical grid through a point of interconnection includes (a) determining, via a controller of the wind farm, a phase and an amplitude of individual power oscillations from each of the plurality of wind turbine power systems. The method also includes (b) determining, via the controller, a farm-level power oscillation for the wind farm based on the individual power oscillations from each of the plurality of wind turbine power systems. Further, the method includes (c) implementing, via the controller, a phase-shifting control scheme using the phases and the amplitudes of the individual power oscillations from each of the plurality of wind turbine power systems so as to maintain the farm-level power oscillation below a predetermined oscillation threshold.

20 Claims, 10 Drawing Sheets

(56) References Cited

U.S. PATENT DOCUMENTS

2014/0195199 A1\* 7/2014 Uluyol .............. G05B 23/0221
            702/189
2017/0130699 A1\* 5/2017 Achilles ............ G05B 13/0205
2018/0347544 A1  12/2018 Grunnet et al.

\* cited by examiner

SYSTEM AND METHOD FOR REDUCING FARM-LEVEL POWER OSCILLATIONS IN THE GRID INDUCED BY A WIND FARM

RELATED APPLICATION

The present application claims priority to PCT Application Serial Number PCT/IB2021/051645, filed on Feb. 26, 2021, which is incorporated by reference herein.

FIELD

The present disclosure relates generally to systems and methods for controlling wind farms having one or more wind turbines, and more particularly, to systems and methods for reducing farm-level power oscillations in the grid induced by a wind farm.

BACKGROUND

Wind power is considered one of the cleanest, most environmentally friendly energy sources presently available, and wind turbines have gained increased attention in this regard. Existing electrical power distribution systems (e.g., electrical grids) can be utilized for distributing power from renewable energy sources, such as wind, if control systems and methodologies are utilized to coordinate power produced by the renewable energy sources, the power demand on the power distribution systems and the power consumed based on the varying operational states that are inherent with respect to renewable energy sources. For example, the operational state of a wind turbine can vary based on wind speeds or the absence of wind.

Wind power does not always have a constant power output, but can include variations; therefore, operators of power distribution systems have to take this into account. One of the consequences is, for example, that the distribution and transmission networks have become more difficult to manage. This pertains also to the management of resonance in a power distribution system, including wind turbines. Like conventional power plants, wind power plants or wind farms should be managed or controlled to provide electrical grids with power that is stable (e.g., with constant voltage and frequency, minimum disturbances, and low harmonics emission) to ensure reliability and proper delivery of power.

With respect to renewable energy plants, such as wind farms, connection of these renewable energy plants to the grid can include long high voltage transmission lines due to the remote locations in which these plants can be located. In addition, wind farms may be connected to unstable grids. Such grids are sensitive to any kind of power and voltage oscillations, especially if large plants (e.g., mining) are connected to the same line. Further, power oscillations induced by wind farms can cause oscillations of the connected components, such as motors. In some instances, grid utilities request such power oscillations to be reduced as low as possible. As an example, the grid utility may prohibit connection of all available wind turbines in a wind farm so as to maintain the power oscillations below a certain level.

In view of the foregoing, systems and methods for damping farm-level power oscillations in the grid induced by a wind farm would be welcomed in the art.

BRIEF DESCRIPTION

Aspects and advantages of the invention will be set forth in part in the following description, or may be obvious from the description, or may be learned through practice of example embodiments of the present disclosure.

In an aspect, the present disclosure is directed to a method for controlling a wind farm having a plurality of wind turbines electrically connected to an electrical grid through a point of interconnection. The method includes (a) determining, via a controller of the wind farm, a phase and an amplitude of individual power oscillations from each of the plurality of wind turbine power systems. The method also includes (b) determining, via the controller, a farm-level power oscillation for the wind farm based on the individual power oscillations from each of the plurality of wind turbine power systems. Further, the method includes (c) implementing, via the controller, a phase-shifting control scheme using the phases and the amplitudes of the individual power oscillations from each of the plurality of wind turbine power systems so as to maintain the farm-level power oscillation below a predetermined oscillation threshold.

In an embodiment, determining the phase and the amplitude of individual power oscillations from each of the plurality of wind turbine power systems may include determining a turbine-level imbalance of each of the plurality of wind turbine power systems based on measuring tower side-to-side accelerations or by measuring turbine-level power oscillations, each of the turbine-level imbalances defining a magnitude and a phase thereof.

In another embodiment, determining the farm-level power oscillation for the wind farm based on the individual power oscillations from each of the plurality of wind turbine power systems may include calculating a cumulative farm-level imbalance for the wind farm as a function of the turbine-level imbalances from each of the plurality of wind turbine power systems.

In further embodiments, determining the farm-level power oscillation for the wind farm based on the individual power oscillations from each of the plurality of wind turbine power systems may include identifying a subset of the plurality of wind turbine power systems contributing a percentage of the cumulative farm-level imbalance above a certain threshold, determining which of the subset of the plurality of wind turbine power systems need a phase shift to reduce the farm-level power oscillation, and applying the phase shift one at a time to the subset of the plurality of wind turbine power systems.

In one embodiment, for example, identifying the subset of the plurality of wind turbine power systems contributing the percentage of the farm-level power oscillation above the certain threshold may include performing a vector addition of the farm-level imbalance and the turbine-level imbalances, wherein a resulting vector magnitude indicates wind turbines in the subset contributing the percentage of the cumulative farm-level imbalance above the certain threshold.

In additional embodiments, the method may include recalculating the farm-level power oscillation for the wind farm between each phase shift. Further, in an embodiment, the phase shift may be opposite of a phase of a resulting imbalance of the plurality of wind turbine power systems.

In particular embodiments, the phase-shifting control scheme may include altering operation of a subset of the plurality of wind turbine power systems when the phases of the power oscillations of a certain percentage of the plurality of wind turbine power systems are equal and maintaining operation of the plurality of wind turbine power systems as-is when the phases of the power oscillations from each of the plurality of wind turbine power systems varies by a certain amount across the wind farm.

For example, in one embodiment, altering operation of the subset of the plurality of wind turbine power systems when the phases of the power oscillations of the certain percentage of the plurality of wind turbine power systems are equal may include changing a rated speed of the subset of the plurality of wind turbine power systems until the phase shifts have been achieved.

In several embodiments, the method may also include verifying the phase shifts by relating the phase of individual power oscillations from each of the plurality of wind turbine power systems to the farm-level power oscillation.

In certain embodiments, determining the phase and the amplitude of individual power oscillations from each of the plurality of wind turbine power systems may include filtering a power signal from each of the plurality of wind turbine power systems and using curve fits on the filtered power signals to determine the phase and the amplitude of individual power oscillations.

In addition, or in the alternative, determining the phase and the amplitude of individual power oscillations from each of the plurality of wind turbine power systems may include filtering a power signal from each of the plurality of wind turbine power systems and using phase lock loops (PLLs) on the filtered power signals to determine the phase and the amplitude of individual power oscillations.

Moreover, in an embodiment, the method may include determining the phase and the amplitude of each of the power oscillations from each of the plurality of wind turbine power systems after each of the plurality of wind turbine power systems reaches rated speed. In further embodiments, the individual power oscillations may be low-frequency power oscillations.

In yet another embodiment, the method may include repeating (a) through (c) periodically or continuously.

In another aspect, the present disclosure is directed to a system for controlling a wind farm having a plurality of wind turbines electrically connected to an electrical grid through a point of interconnection. The system includes a plurality of turbine controllers for controlling the plurality of wind turbine power systems, respectively, and a farm-level controller communicatively coupled to the plurality of turbine controllers for controlling the wind farm. The farm-level controller includes at least one processor for implementing a plurality of operations, including but not limited to, once each of the plurality of wind turbine power systems reaches rated speed, determining a phase and an amplitude of individual power oscillations from each of the plurality of wind turbine power systems, determining a farm-level power oscillation for the wind farm based on the individual power oscillations from each of the plurality of wind turbine power systems, and implementing a phase-shifting control scheme using the phases and the amplitudes of the individual power oscillations from each of the plurality of wind turbine power systems so as to maintain the farm-level power oscillation below a predetermined oscillation threshold.

It should be understood that the system may further include any of the additional features described herein.

Variations and modifications can be made to these example aspects of the present disclosure. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
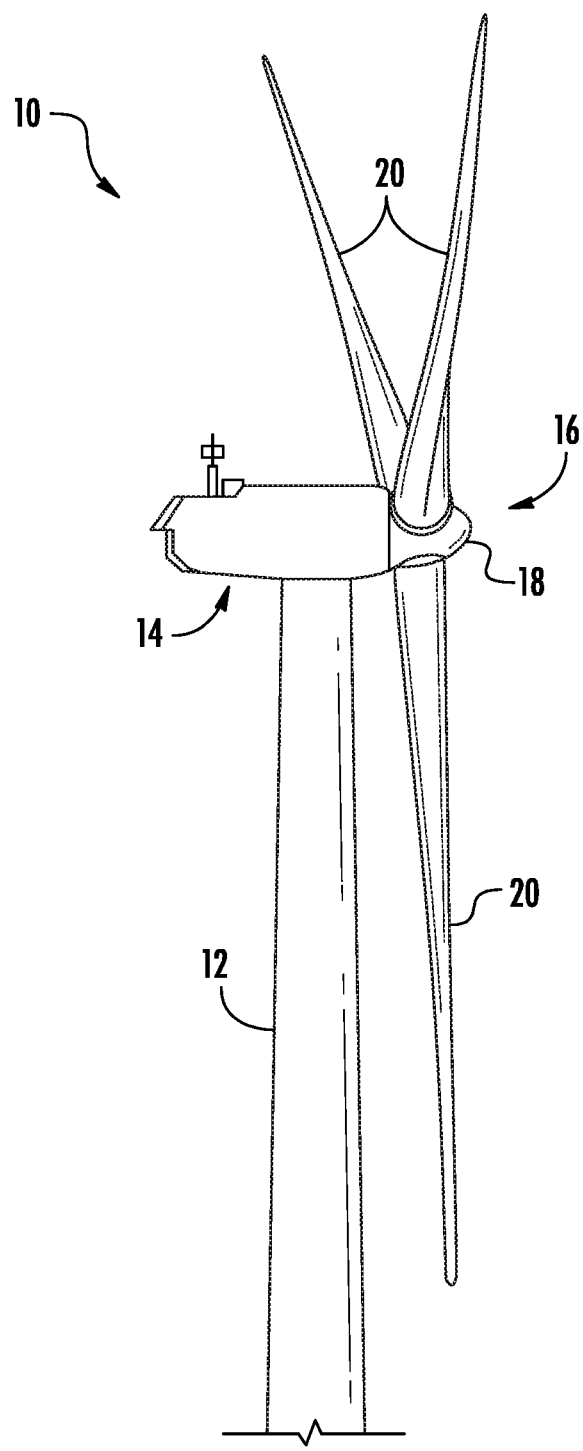
FIG. 1 illustrates a perspective view of a portion of a wind turbine according to example embodiments of the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Referring now to the figures, FIG. 1 depicts a perspective view of one embodiment of a wind turbine 10 according to the present disclosure. As shown, the wind turbine 10 generally includes a tower 12 extending from a support surface (not shown), a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to a generator 28 (FIG. 2) positioned within the nacelle 14 to permit electrical energy to be produced.

Figure 2:
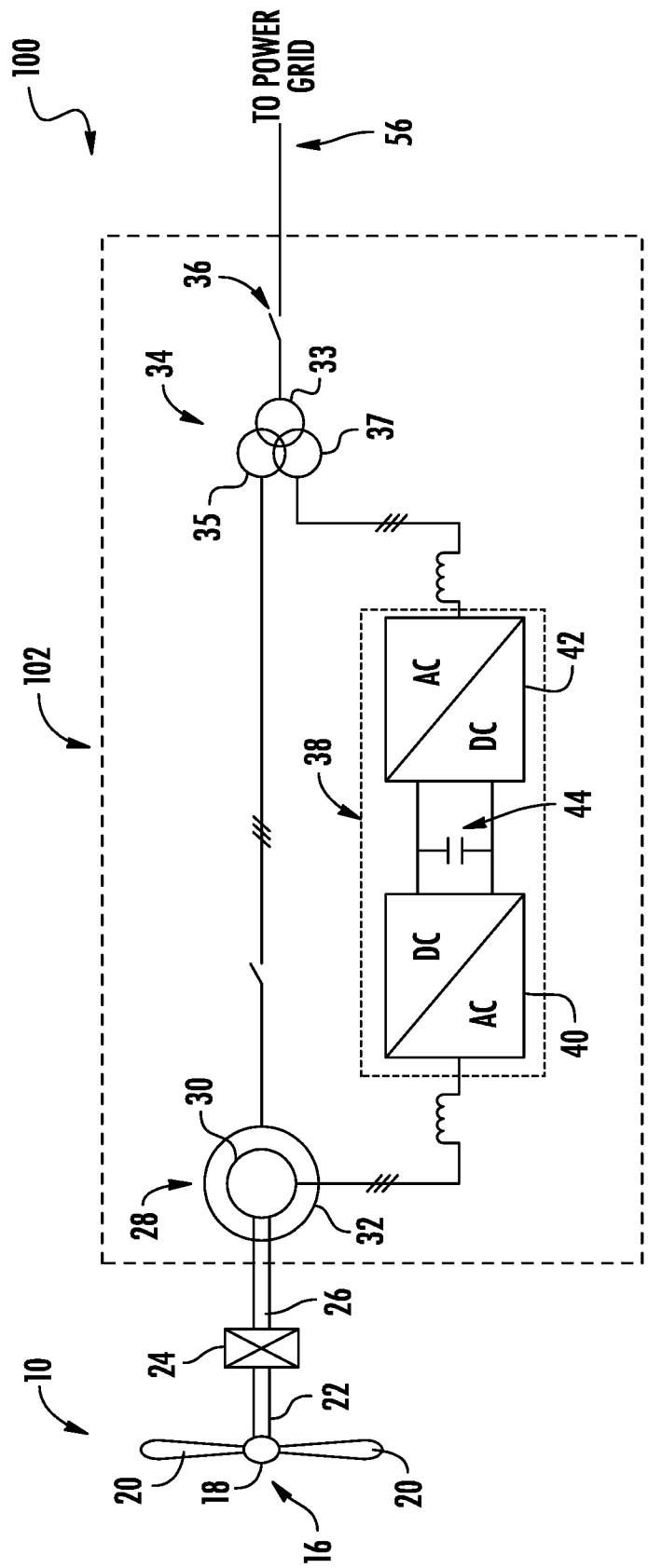
FIG. 2 illustrates a schematic diagram of a wind turbine electrical power system according to example embodiments of the present disclosure which is suitable for use with the wind turbine shown in FIG. 1.

Referring now to FIG. 2, a wind turbine power system 100, which includes the wind turbine 10 and associated power system 102, is illustrated. As wind impacts the rotor blades 20, the blades 20 transform wind energy into a mechanical rotational torque that rotatably drives a low-speed shaft 22. The low-speed shaft 22 is configured to drive a gearbox 24 (where present) that subsequently steps up the low rotational speed of the low-speed shaft 22 to drive a high-speed shaft 26 at an increased rotational speed. The high-speed shaft 26 is generally rotatably coupled to a generator 28 (such as a doubly-fed induction generator or DFIG) so as to rotatably drive a generator rotor 30. As such, a rotating magnetic field may be induced by the generator rotor 30 and a voltage may be induced within a generator stator 32 that is magnetically coupled to the generator rotor 30. The associated electrical power can be transmitted from the generator stator 32 to a main three-winding transformer 34 that is connected to an electrical grid at a POI 56 via a grid breaker 36. Thus, the transformer 34 steps up the voltage amplitude of the electrical power such that the transformed electrical power may be further transmitted to the electrical grid.

In addition, as shown, the generator 28 may be electrically coupled to a bi-directional power converter 38 that includes a rotor-side converter 40 joined to a line-side converter 42 via a regulated DC link 44. The rotor-side converter 40 converts the AC power provided from the generator rotor 30 into DC power and provides the DC power to the DC link 44. The line side converter 42 converts the DC power on the DC link 44 into AC output power suitable for the electrical grid. Thus, the AC power from the power converter 38 can be combined with the power from the generator stator 32 to provide multi-phase power (e.g. three-phase power) having a frequency maintained substantially at the frequency of the electrical grid (e.g. 50 Hz/60 Hz).

Figure 3:
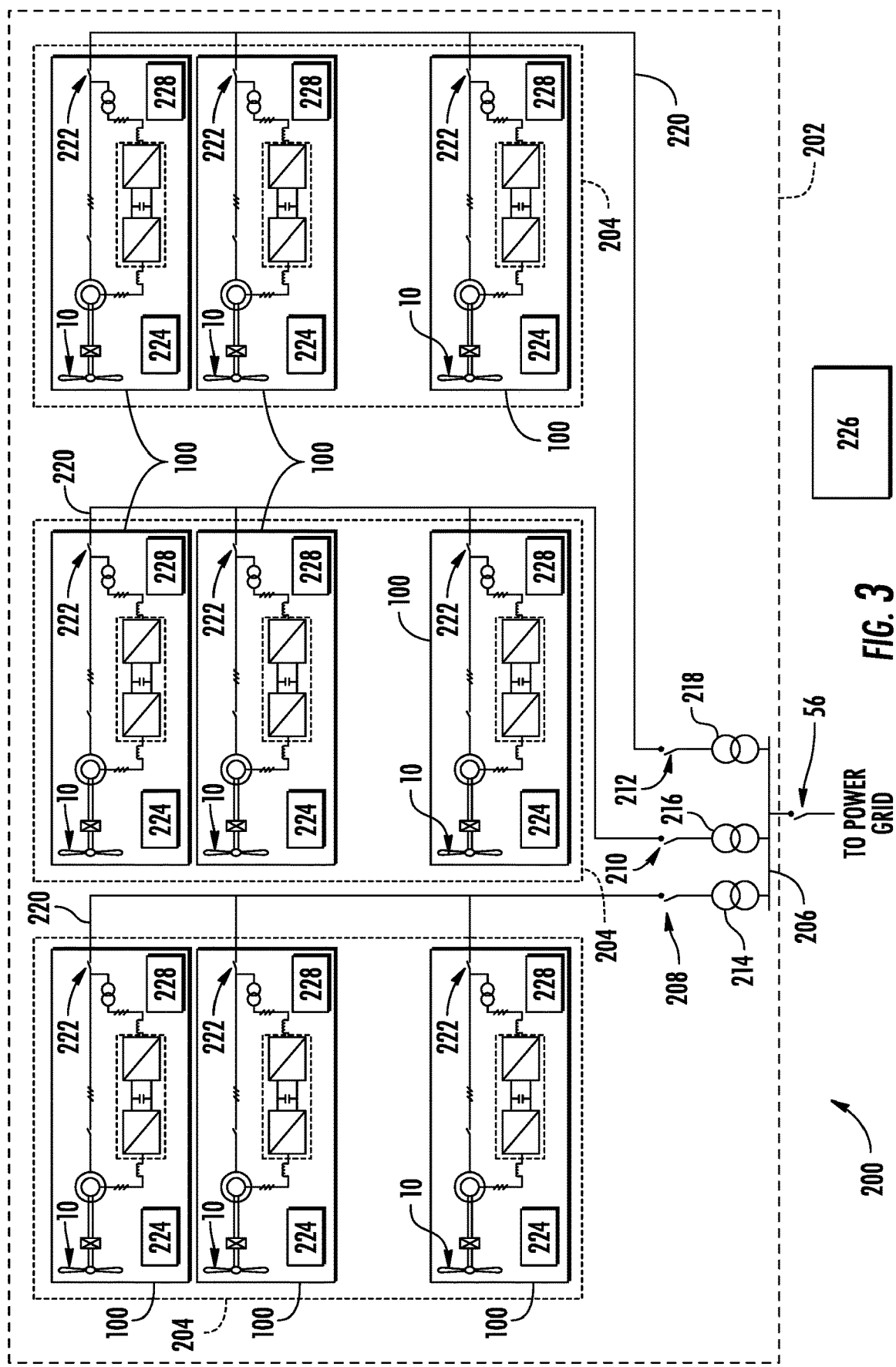
FIG. 3 illustrates a schematic diagram of a wind farm electrical power system according to example embodiments of the present disclosure.

In some configurations, the power system 102 can include a turbine level controller 224 (shown in FIG. 3). The turbine level controller 224 can be a control, such as the controller shown and described in FIG. 4.

The transformer 34 can have (1) a 33 kilovolt (kV) medium voltage (MV) primary winding 33 connected to the electrical grid, (2) a 6 to 13.8 kV MV secondary winding 35 connected to the generator stator 32, and (3) a 690 to 900 volt (V) low-voltage (LV) tertiary winding 37 connected to the line-side converter 42.

Referring particularly to FIG. 3, a schematic diagram of one embodiment of a wind farm 200 according to example embodiments of the present disclosure is illustrated. More specifically, as shown, the wind farm 200 can include a plurality of wind turbine power systems 100, connected to an electrical grid via a POI 56. The wind farm 200 may include at least two clusters 204 to form an electrical power system. Individual wind turbine power systems 100 including of a plurality of wind turbines 10 may be arranged in predetermined geographic locations and electrically connected together to form a wind farm 202.

The electrical power associated with each wind turbine power system 100 can be transmitted to a main line 206 via one or more cluster lines 220. Each wind turbine power system 100 can be connected or disconnected to the one or more cluster lines 220 via one or more switches 222 or breakers. Wind turbine power systems 100 may be arranged into a plurality of groups (or clusters) 204 with each group separately connected to a main line 206 via switches 208, 210, 212, respectively. Thus, as shown, each cluster 204 may be connected to a separate transformer 214, 216, 218 via switches 208, 210, 212, respectively, for stepping up the voltage amplitude of the electrical power from each cluster 204 such that the transformed electrical power may be further transmitted to the electrical grid. In addition, as shown, the transformers 214, 216, 218 are connected to a main line 206 that combines the voltage from each cluster 204 before sending the power to the grid via a POI 56. The POI 56 can be a breaker, switch or other known method of connection to an electrical grid.

Each wind turbine power system 100 can include a voltage regulator 228 (i.e., a wind turbine terminal voltage regulator). As such, the voltage regulator 228 regulates the voltage which is output by each wind turbine power system 100. Further, the voltage regulator 228 can be in electrical communication with turbine controller 224 or farm-level controller 226. Thus, the turbine-level controller 224 or farm-level controller 226 can deliver a voltage regulator gain command (VCMD) to one or more of the voltage regulators 228 which in turn dictates the amount of power distributed to the POI 56 via cluster lines 220.

Each wind turbine power system 100 can include one or more controllers, such as turbine controller 224. The turbine controller 224 can be configured to control the components of the wind turbine power system 100, including switches 222 or voltage regulator 228, and/or implement some or all the method steps as described herein. The turbine controller 224 can be located on or within each wind turbine 10 or can be located remotely from each wind turbine 10. The turbine controller 224 can be part of or included with one or more of the other controllers associated with wind turbine power system 100 and/or the wind farm 200. The turbine controller 224 can operate switches 222 to connect or disconnect the one or more wind turbine power systems 100 from the cluster lines 220 and control the voltage regulator 228, such as the voltage regulator gain, based at least in part on the power required at the POI 56, and/or based, at least in part, on characteristics of the wind turbine power system 100, wind farm 200, and/or characteristics of the wind turbines 10 (e.g., wind turbine size, location, age, maintenance status), the electrical grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

The wind farm 200 can include one or more controllers, such as farm-level controller 226 (also referred to herein as a farm-level controller). The farm-level controller 226 can be configured to control the components of the wind farm 200, including switches 208, 210 and 212, voltage regulators 228, communicate with one or more other controllers, such as turbine-level controllers 224, and/or implement some or all the method steps as described herein. The farm-level controller 226 can be located within the geographic area of the wind farm 200, or any portion thereof, or can be located remotely from the wind farm 200, or any portion thereof. The farm-level controller 226 can be part of or included with one or more of the other controllers associated with one or more of the wind turbine power systems 100 and/or the wind farm 200. Each of the clusters 204, wind turbine power systems 100, or turbine-level controllers 224, may be communicatively coupled with a Farm-level controller 226.

The farm-level controller 226 can generate and send control signals to turbine controller 224 to operate switches 222 to connect or disconnect the one or more wind turbine power systems 100 from the cluster lines 220 based at least in part on the power required at the POI 56. The farm-level controller 226 can generate and send control signals to voltage regulators 228 to operate or control the voltage regulators 228 and control the amount of power delivered to the POI from the one or more wind turbine power systems 100 through the cluster lines 220 based at least in part on the power required at the POI 56. The farm-level controller 226 can generate and send control signals to switches 208, 210 and/or 212 and/or voltage regulators 228 to regulate the power delivered to the POI 56, based at least in part on the power required at the POI 56, and/or based, at least in part, on characteristics of the wind turbine power system 100, wind farm 200, and/or characteristics of the wind turbines 10 (e.g., wind turbine size, location, age, maintenance status), the electrical grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

Figure 4:
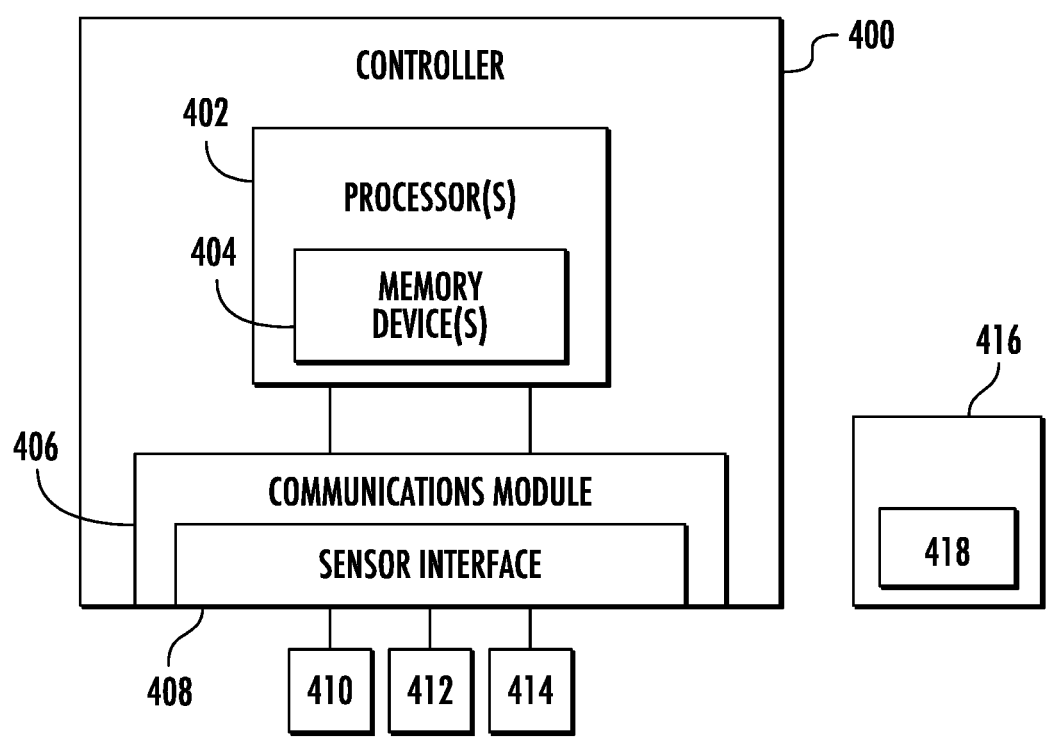
FIG. 4 illustrates a block diagram of a controller according to example embodiments of the present disclosure.

Referring now to FIG. 4, a block diagram of a controller 400 according to example embodiments of the present disclosure is illustrated. As shown, the controller 400 can be a turbine-level controller 224 or farm-level controller 226. Further, as shown, the controller 400 can include one or more processors 402 and associated memory device(s) 404 configured to perform a variety of computer-implemented functions (e.g., performing the methods, steps, calculations and the like and storing relevant data as disclosed herein). The memory device 404 may also store date relevant to certain characteristics of the wind turbine power system 100, wind farm 200, and/or characteristics of the wind turbines 10 (e.g., wind turbine size, location, age, maintenance status), the electrical grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

Additionally, the controller 400 may include a communications module 406 to facilitate communications between the controller and the various components of the wind turbine power system 100, the wind farm 200 and/or the farm-level controller 226, including communication between farm-level controller 226 and turbine-level controller 224. Further, the communications module 406 may include a sensor interface 408 (e.g., one or more analog-to-digital converters) to permit signals transmitted from one or more sensors 410, 412 and 414 to be converted into signals that can be understood and processed by the processors 402. Sensors 410, 412 and 414 can be used to measure, ascertain or gather data regarding characteristics of the wind turbine power system 100, wind farm 200, and/or characteristics of the wind turbines 10 (e.g., wind turbine size, location, age, maintenance status), the electrical grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

Still referring to FIG. 4, the controller 400 can also include a user interface 416. The user interface 416 can have various configurations and controls can be mounted or in user interface 416. The user interface 416 can also be located within the geographic area of the wind farm 200, or any portion thereof, or can be located remotely from the wind farm 200, or any portion thereof. The user interface 416 can include an input component 418. Input component 418 can be, for instance, a capacitive touch screen. The input component 418 can allow for the selective activation, adjustment or control of farm-level controller 226 and turbine controller 224, as well as any timer features or other user adjustable inputs. One or more of a variety of electrical, mechanical or electro-mechanical input devices, including rotary dials, push buttons, and touch pads, can also be used singularly or in combination as input component 418. The user interface 416 can include a display component, such as a digital or analog display device designed to provide operation feedback to a user.

It should be appreciated that the sensors 410, 412 and 414 may be communicatively coupled to the communications module 406 using any suitable means. For example, the sensors 410, 412 and 414 may be coupled to the sensor interface 408 via a wired connection. However, in other embodiments, the sensors 410, 412 and 414 may be coupled to the sensor interface 408 via a wireless connection, such as by using any suitable wireless communications protocol known in the art. As such, the processor 402 may be configured to receive one or more signals from the sensors 410, 412 and 414. Sensors 410, 412 and 414 can be part of or included with one or more of the other controllers associated with one or more of the wind turbine power systems 100 and/or the wind farm 200. Sensors 410, 412 and 414 can also be located within the geographic area of the wind farm 200, or any portion thereof, or can be located remotely from the wind farm 200, or any portion thereof.

It should also be understood that sensors 410, 412 and 414 can be any number or type of voltage and/or electric current sensors may be employed within the wind turbine power systems 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art. Thus, the one or more controllers, such as farm-level controller 226 and turbine controller 224, are configured to receive one or more voltage and/or electric current feedback signals from sensors 410, 412 and 414.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 402 is also configured to compute advanced control algorithms and communicate to a variety of Ethernet or serial-based protocols (Modbus, OPC, CAN, etc.). Additionally, the memory device(s) 404 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 402, configure the controller to perform the various functions as described herein.

Figure 5:
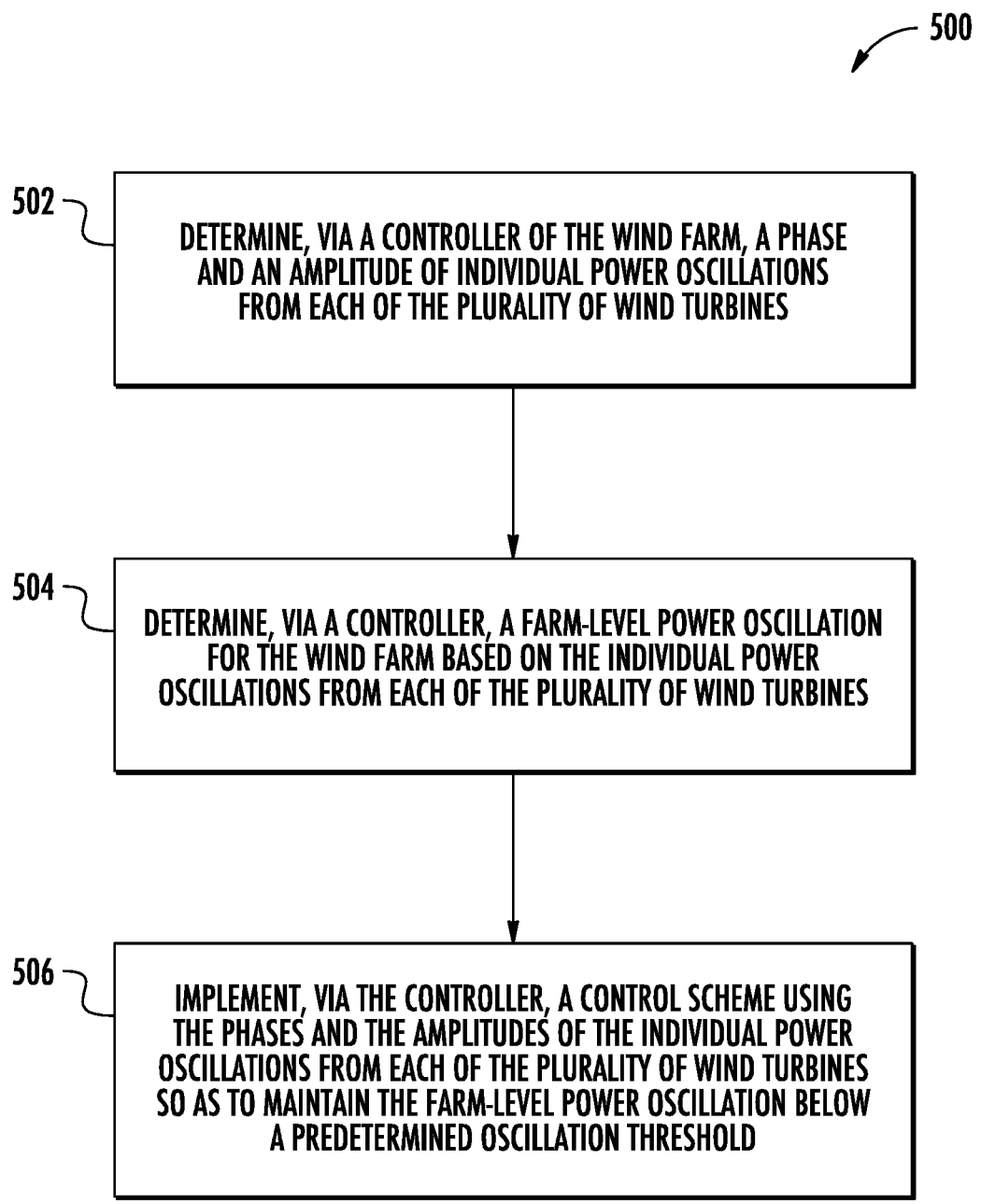
FIG. 5 illustrates a flow diagram of one embodiment of a method for controlling a wind farm having a plurality of wind turbines electrically connected to an electrical grid through a point of interconnection of the present disclosure.

Referring now to FIG. 5, a flow diagram of one embodiment of a method 500 for controlling a wind farm having a plurality of wind turbines electrically connected to an electrical grid through a point of interconnection according to the present disclosure. In general, the method 500 is described herein with reference to the wind turbine 10, the wind turbine power system 100, the wind farm 200, and the various controllers illustrated in FIGS. 1-4. However, it should be appreciated that the disclosed method 500 may be implemented with wind turbines and wind farms having any other suitable configurations. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. Moreover, it should be understood that the method 500 can be performed by one or more controllers, such as farm-level controller 226 and/or turbine-level controller 224, and by the other devices included with a wind turbine power system 100 and/or wind farm 200.

Referring particularly to FIG. 5, as shown at (502), the method 500 includes (a) determining, via a controller of the wind farm, a phase and an amplitude of individual power oscillations from each of the plurality of wind turbine power systems 100. More specifically, in an embodiment, the method 500 may include determining the phase and the amplitude of each of the power oscillations from each of the plurality of wind turbine power systems 100 after each of the plurality of wind turbine power systems 100 reaches rated speed. In certain embodiments, the individual power oscillations may be low-frequency power oscillations. For example, in an embodiment, the farm-level controller 226 may determine the phase and the amplitude of individual power oscillations from each of the plurality of wind turbine power systems 100 by determining a turbine-level imbalance of each of the plurality of wind turbine power systems 100 based on measuring tower side-to-side accelerations or by measuring turbine-level power oscillations, with each of the turbine-level imbalances defining a magnitude and a phase thereof.

In alternative embodiments, the farm-level controller 226 may determine the phase and the amplitude of individual power oscillations from each of the plurality of wind turbine power systems 100 by filtering a power signal from each of the plurality of wind turbine power systems and using curve fits on the filtered power signals to determine the phase and the amplitude of individual power oscillations.

In addition, or in another alternative, the farm-level controller 226 may determine the phase and the amplitude of individual power oscillations from each of the plurality of wind turbine power systems 100 by filtering a power signal from each of the plurality of wind turbine power systems 100 and using phase lock loops (PLLs) on the filtered power signals to determine the phase and the amplitude of individual power oscillations.

Referring still to FIG. 5, as shown at (504), the method 500 includes (b) determining, via the farm-level controller 226, a farm-level power oscillation for the wind farm 200 based on the individual power oscillations from each of the plurality of wind turbine power systems 100. For example, in one embodiment, the farm-level controller 226 can determine the farm-level power oscillation for the wind farm 200 based on the individual power oscillations from each of the plurality of wind turbine power systems 100 by calculating a cumulative farm-level imbalance for the wind farm 200 as a function of the turbine-level imbalances from each of the plurality of wind turbine power systems 100. In another embodiment, the farm-level power oscillation can be determined as a direct measurement via the farm-level controller 226 (e.g., power oscillations measured at the wind farm's interconnection point).

Figure 6:
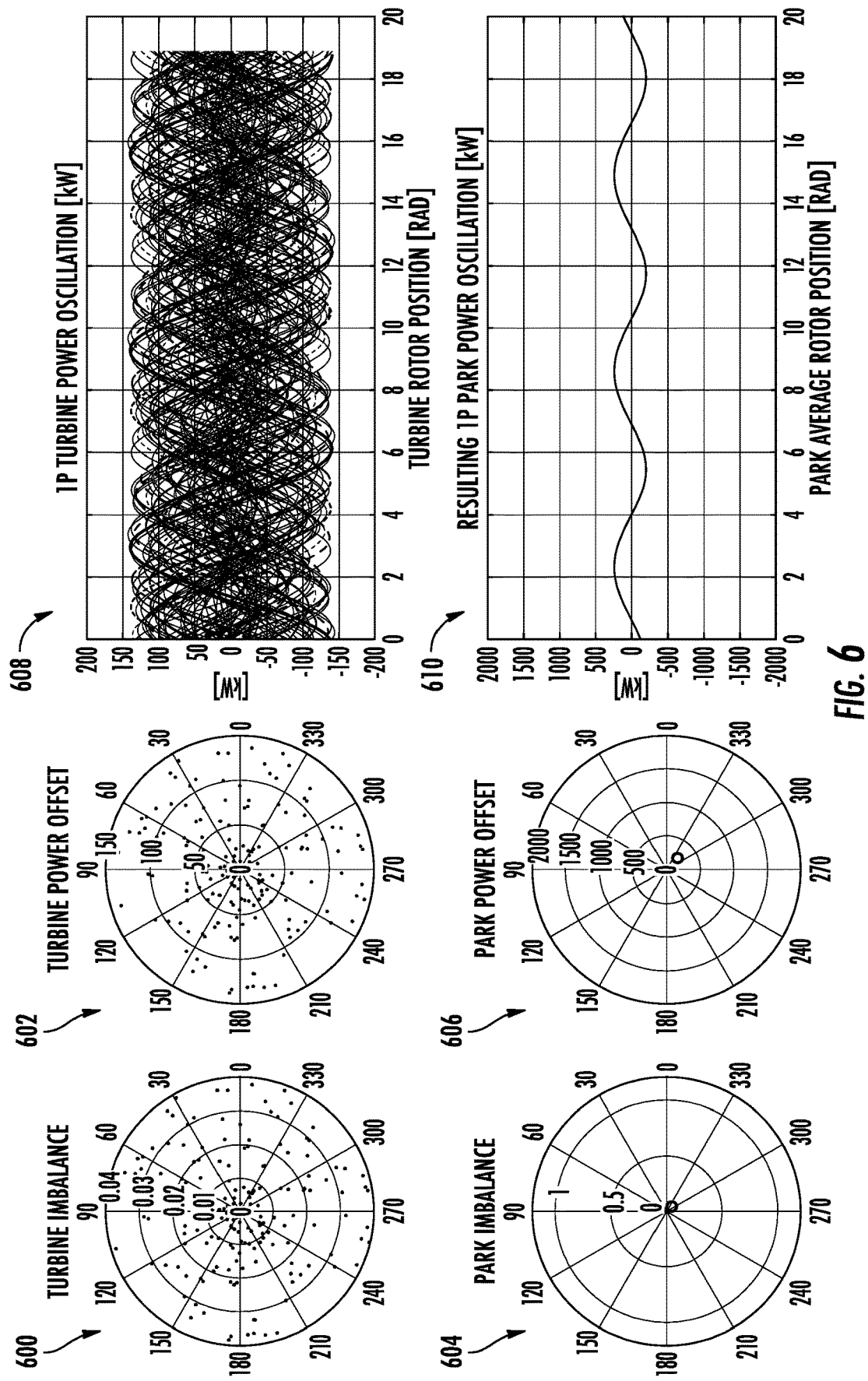
FIG. 6 illustrates example data plots of one embodiment of a simulated imbalance distribution in a wind farm according to the present disclosure, particularly illustrating a wind farm having well-distributed turbine imbalance.

For example, in particular embodiments, FIG. 6 illustrates example simulated data plots of one embodiment of an imbalance distribution in a wind farm according to the present disclosure. As shown in the Turbine imbalance and Turbine power offset data plots 600, 602, the power oscillations of each wind turbine power system is well distributed, resulting in low Park imbalance and Park power offset illustrated in data plots 604, 606. Thus, as shown via data plots 608 and 610, when the park imbalance and power offset are low, the wind farm also has low resulting farm-level oscillations.

Figure 7:
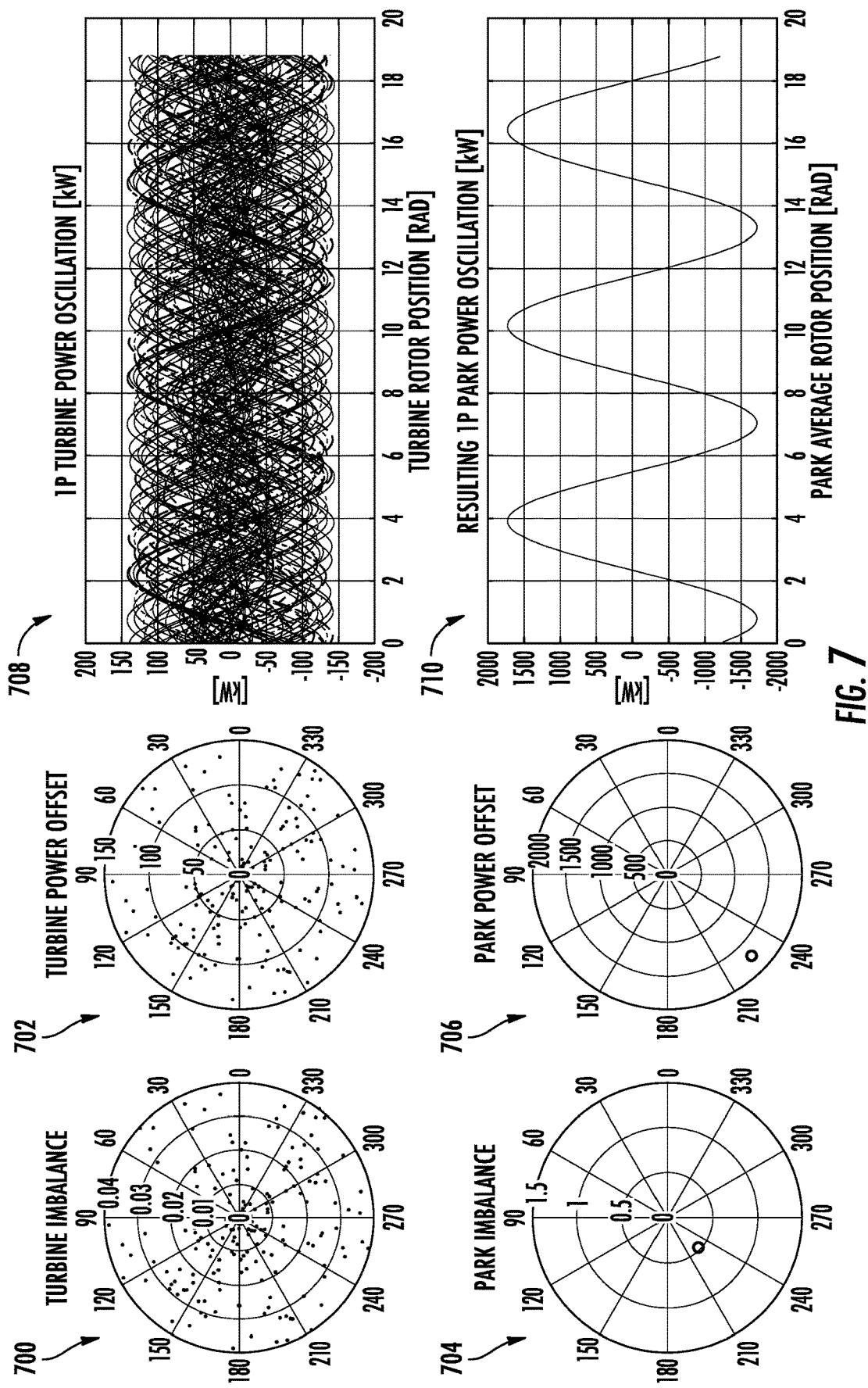
FIG. 7 illustrates example data plots of one embodiment of an imbalance distribution in a wind farm according to the present disclosure, particularly illustrating a wind farm having unevenly distributed turbine imbalance.

In contrast, as shown in FIG. 7, example simulated data plots of one embodiment of an imbalance distribution in a wind farm are illustrated. As shown in the Turbine imbalance and Turbine power offset data plots 700, 702, the power oscillations of each wind turbine power system is unevenly distributed, resulting in high Park imbalance and Park power offset illustrated in data plots 704, 706. Thus, as shown via data plots 708 and 710, when the park imbalance and power offset are high, the wind farm contributes increased farm-level oscillations. Accordingly, turbine-level imbalance can be used as an indicator of farm-level power oscillations.

In further embodiments, the farm-level controller 226 can determine the farm-level power oscillation for the wind farm 200 based on the individual power oscillations from each of the plurality of wind turbine power systems 100 by identifying a subset of the plurality of wind turbine power systems 100 contributing a percentage of the cumulative farm-level imbalance above a certain threshold, determining which of the wind turbine power systems 100 within the subset need a phase shift to reduce the farm-level power oscillation, and applying the phase shift one at a time to the wind turbine power systems 100 in the subset that need the phase shift.

In one embodiment, for example, the farm-level controller 226 may identify the subset of the plurality of wind turbine power systems 100 contributing the percentage of the farm-level power oscillation above the certain threshold by performing a vector addition of the farm-level imbalance and the turbine-level imbalances. In such embodiments, a resulting vector magnitude indicates wind turbine power systems 100 in the subset contributing the percentage of the cumulative farm-level imbalance above the certain threshold.

Figure 8:
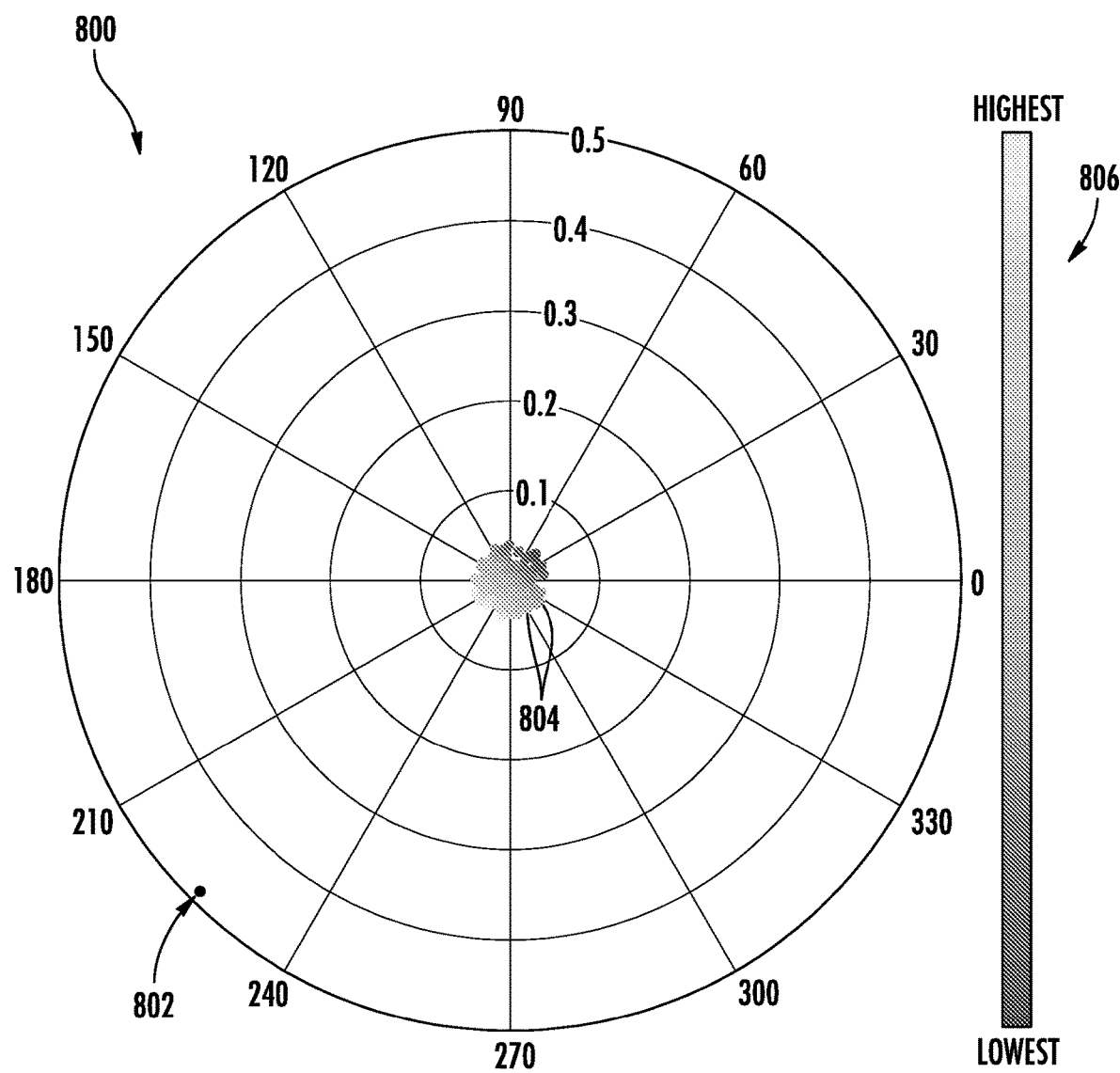
FIG. 8 illustrates a data plot of one embodiment of a plurality of wind turbine power systems having the highest contribution of imbalance according to the present disclosure.

More specifically, as shown in FIG. 8, the farm-level controller 226 may identify the most impactful wind turbine power systems 100 by performing a vector addition of the farm-level imbalance and the turbine-level imbalance and using the resulting vector magnitude as an indicator. The wind turbine power systems 100 with the highest magnitude contribute most to the current imbalance. Thus, as shown in FIG. 8, the plot 800 indicates the resulting park level imbalance via marker 802 and the individual turbine imbalances are shown via markers 804. The shaded scale 806 (e.g., from dark to light) indicates turbines contributing the largest amount of imbalance (lightest shading).

Moreover, in additional embodiments, the method 500 may include recalculating the farm-level power oscillation for the wind farm 200 between each phase shift, e.g., to determine if the power oscillations have returned to an acceptable level. Further, in an embodiment, the phase shift may be opposite of a phase of a resulting imbalance of the plurality of wind turbine power systems 100.

Referring back to FIG. 5, as shown at (506), the method 500 includes (c) implementing, via the farm-level controller 226, a phase-shifting control scheme using the phases and the amplitudes of the individual power oscillations from each of the plurality of wind turbine power systems 100 so as to maintain the farm-level power oscillation below a predetermined oscillation threshold. In yet another embodiment, the method 500 may include repeating steps (a) through (c) periodically or continuously.

Furthermore, in particular embodiments, the phase-shifting control scheme may include altering operation of a subset of the plurality of wind turbine power systems 100 when the phases of the power oscillations of a certain percentage of the plurality of wind turbine power systems 100 are equal. For example, in one embodiment, altering operation of the subset of the plurality of wind turbine power systems 100 when the phases of the power oscillations of the certain percentage of the plurality of wind turbine power systems 100 are equal may include changing a rated speed of the subset of the plurality of wind turbine power systems 100 until the phase shifts have been achieved. In particular embodiments, as an example, if a phase shift of 180° or pi is intended and the wind turbine power system 100 is operating with a rated speed of 12 rotations per minute (RPM), the speed may be reduced by the farm-level controller 226 to 11.5 RPM for one minute.

Figure 9:
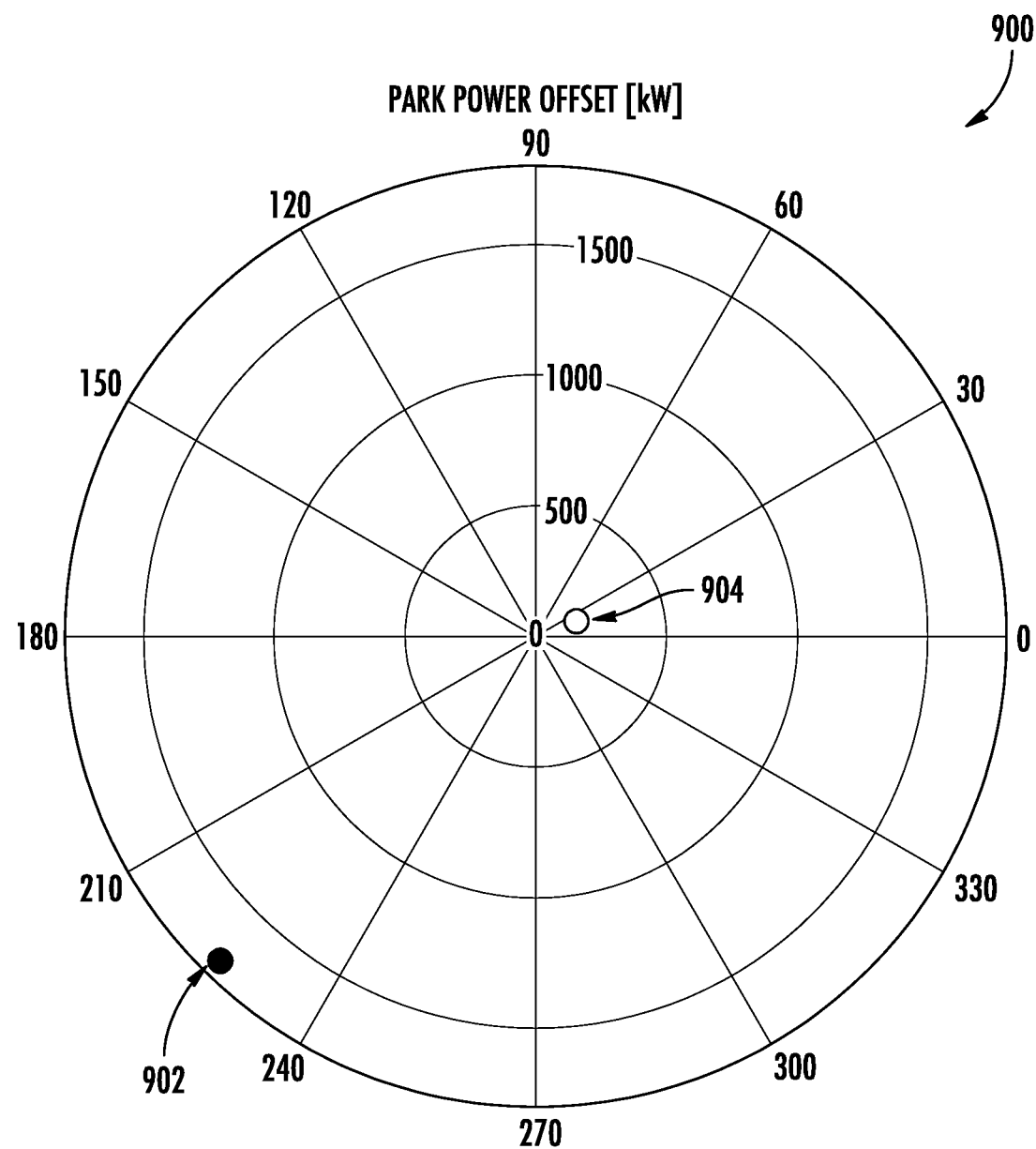
FIG. 9 illustrates a data plot of one embodiment of a farm-level power offset before farm-level balancing and after fam-level balancing according to the present disclosure.

Further, in several embodiments, the method 500 may also include verifying the phase shifts by relating the phase of individual power oscillations from each of the plurality of wind turbine power systems 100 to the farm-level power oscillation. For example, in such embodiments, the farm-level controller 226 can verify the phase shift by relating the individual turbines phase (e.g., rotor position plus imbalance direction) to the summed farm-level phase (e.g., the sum of all rotor positions and imbalance directions). The farm-level controller 226 can then calculate which of the wind turbines need to be shifted by which phase to reach an acceptable power oscillation level (for example, using simply mathematical equations without the need for simulations). Thus, in one embodiment, as shown in the data plot 900 of FIG. 9, the farm-level controller 226 can select the wind turbines ranked by their contribution to the overall farm imbalance, with the worst case wind turbines being shifted first since such wind turbines compensate most once phase shifted. Thus, as shown, the overall power oscillations can be reduced by reducing an initial farm-level imbalance 902 to a reduced farm-level imbalance 904.

In addition, it should be understood that the phase-shifting control scheme may also include maintaining operation of the plurality of wind turbine power systems 100 as-is when the phases of the power oscillations from each of the plurality of wind turbine power systems 100 varies by a certain amount across the wind farm 200 (i.e., the phases are well-distributed across the wind farm, such as illustrated in FIG. 6).

Figure 10:
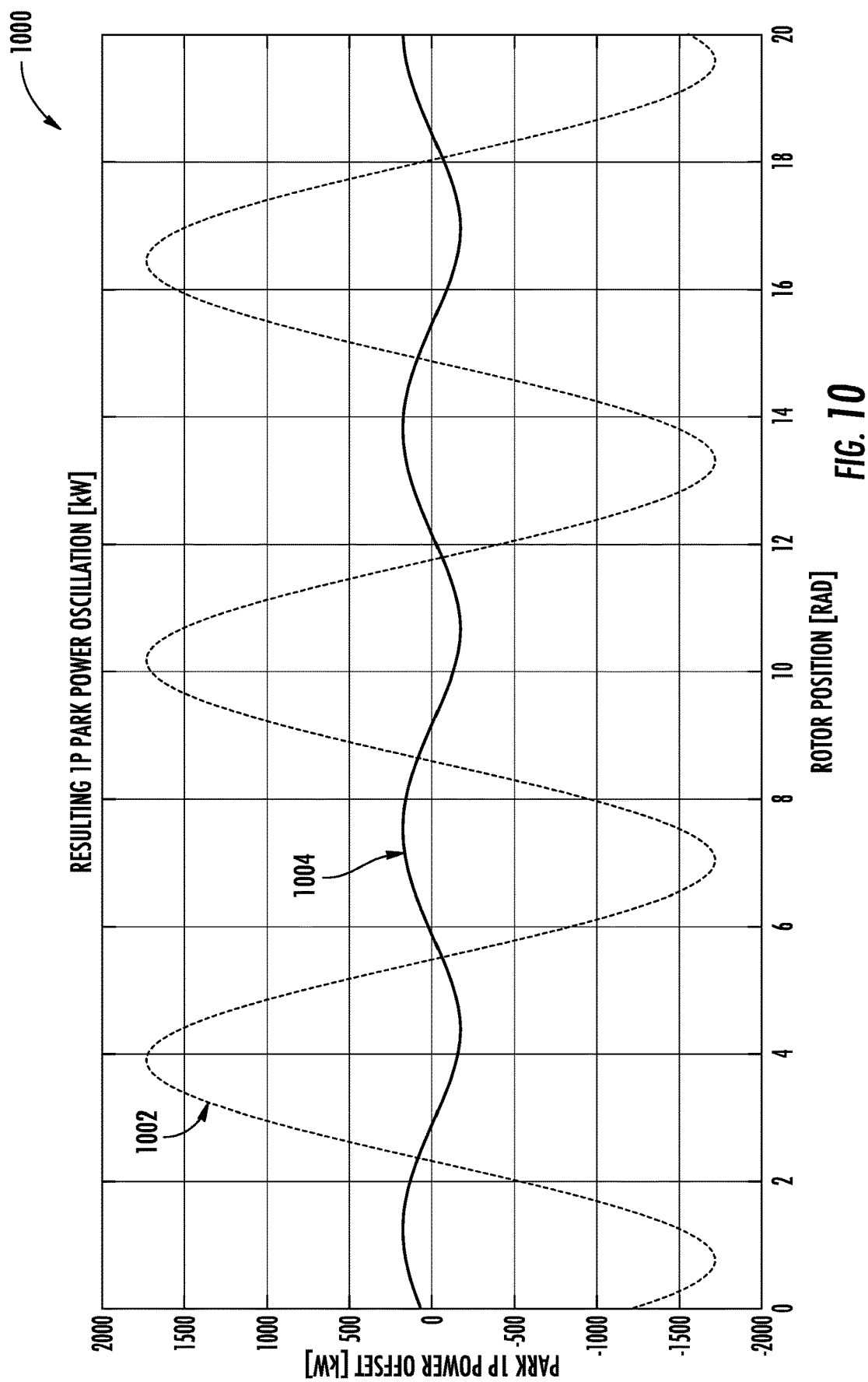
FIG. 10 illustrates a graph of farm-level power offset (y-axis) versus rotor position (x-axis) to illustrate the farm-level power oscillations according to the present disclosure.

Referring now to FIG. 10, yet another graph 1000 is provided of farm-level power offset (y-axis) versus rotor position (x-axis) to illustrate the farm-level power oscillations according to the present disclosure. In particular, as shown, curve 1002 illustrates the farm-level power oscillations prior to implementing the phase-shifting control scheme described herein. In contrast, as shown, curve 1004 illustrates the farm-level power oscillations after implementing the phase-shifting control scheme described herein. Thus, as shown, the phase-shifting control scheme of the present disclosure is configured to reduce the farm-level power oscillations using the methods described herein.

Various aspects and embodiments of the present invention are defined by the following numbered clauses:

Clause 1. A method for controlling a wind farm having a plurality of wind turbine power systems electrically connected to an electrical grid through a point of interconnection, the method comprising:
(a) determining, via a controller of the wind farm, a phase and an amplitude of individual power oscillations from each of the plurality of wind turbine power systems;
(b) determining, via the controller, a farm-level power oscillation for the wind farm based on the individual power oscillations from each of the plurality of wind turbine power systems; and,
(c) implementing, via the controller, a phase-shifting control scheme using the phases and the amplitudes of the individual power oscillations from each of the plurality of wind turbine power systems so as to maintain the farm-level power oscillation below a predetermined oscillation threshold.

Clause 2. The method of clause 1, wherein determining the phase and the amplitude of individual power oscillations from each of the plurality of wind turbine power systems further comprises:
determining a turbine-level imbalance of each of the plurality of wind turbine power systems based on measuring at least one of tower side-to-side accelerations or by measuring turbine-level power oscillations, each of the turbine-level imbalances defining a magnitude and a phase thereof.

Clause 3. The method of clause 2, wherein determining the farm-level power oscillation for the wind farm based on the individual power oscillations from each of the plurality of wind turbine power systems further comprises:
calculating a cumulative farm-level imbalance for the wind farm as a function of the turbine-level imbalances from each of the plurality of wind turbine power systems.

Clause 4. The method of clause 3, wherein determining the farm-level power oscillation for the wind farm based on the individual power oscillations from each of the plurality of wind turbine power systems further comprises:
identifying a subset of the plurality of wind turbine power systems contributing a percentage of the cumulative farm-level imbalance above a certain threshold;
determining which of the subset of the plurality of wind turbine power systems need a phase shift to reduce the farm-level power oscillation; and,
applying the phase shift one at a time to the subset of the plurality of wind turbine power systems.

Clause 5. The method of clause 4, wherein identifying the subset of the plurality of wind turbine power systems contributing the percentage of the farm-level power oscillation above the certain threshold further comprises:
performing a vector addition of the farm-level imbalance and the turbine-level imbalances, wherein a resulting vector magnitude indicates wind turbines in the subset contributing the percentage of the cumulative farm-level imbalance above the certain threshold.

Clause 6. The method of clauses 4-5, further comprising recalculating the farm-level power oscillation for the wind farm between each phase shift.

Clause 7. The method of clauses 4-6, wherein the phase shift is opposite of a phase of a resulting imbalance of the plurality of wind turbine power systems.

Clause 8. The method of clauses 4-7, wherein the phase-shifting control scheme comprises:
altering operation of a subset of the plurality of wind turbine power systems when the phases of the power oscillations of a certain percentage of the plurality of wind turbine power systems are equal; and,
maintaining operation of the plurality of wind turbine power systems as-is when the phases of the power oscillations from each of the plurality of wind turbine power systems varies by a certain amount across the wind farm.

Clause 9. The method of clause 8, wherein altering operation of the subset of the plurality of wind turbine power systems when the phases of the power oscillations of the certain percentage of the plurality of wind turbine power systems are equal further comprises:
changing a rated speed of the subset of the plurality of wind turbine power systems until the phase shifts have been achieved.

Clause 10. The method of clause 9, further comprising verifying the phase shifts by relating the phase of individual power oscillations from each of the plurality of wind turbine power systems to the farm-level power oscillation.

Clause 11. The method of any of the preceding clauses, wherein determining the phase and the amplitude of individual power oscillations from each of the plurality of wind turbine power systems further comprises:
filtering a power signal from each of the plurality of wind turbine power systems; and,
using curve fits on the filtered power signals to determine the phase and the amplitude of individual power oscillations.

Clause 12. The method of any of the preceding clauses, wherein determining the phase and the amplitude of individual power oscillations from each of the plurality of wind turbine power systems further comprises:
filtering a power signal from each of the plurality of wind turbine power systems; and,
using phase lock loops (PLLs) on the filtered power signals to determine the phase and the amplitude of individual power oscillations.

Clause 13. The method of any of the preceding clauses, further comprising determining the phase and the amplitude of each of the power oscillations from each of the plurality of wind turbine power systems after each of the plurality of wind turbine power systems reaches rated speed.

Clause 14. The method of any of the preceding clauses, wherein the individual power oscillations comprise low-frequency power oscillations.

Clause 15. The method of any of the preceding clauses, further comprising repeating (a) through (c) periodically or continuously.

Clause 16. A system for controlling a wind farm having a plurality of wind turbines electrically connected to an electrical grid through a point of interconnection, the system comprising:
a plurality of turbine controllers for controlling a plurality of wind turbine power systems, respectively, of the wind farm; and,
a farm-level controller communicatively coupled to the plurality of turbine controllers for controlling the wind farm, the farm-level controller comprising at least one processor for implementing a plurality of operations, the plurality of operations comprising:
once each of the plurality of wind turbine power systems reaches rated speed, determining a phase and an amplitude of individual power oscillations from each of the plurality of wind turbine power systems;
determining a farm-level power oscillation for the wind farm based on the individual power oscillations from each of the plurality of wind turbine power systems; and,
implementing a phase-shifting control scheme using the phases and the amplitudes of the individual power oscillations from each of the plurality of wind turbine power systems so as to maintain the farm-level power oscillation below a predetermined oscillation threshold.

Clause 17. The system of clause 16, wherein determining the phase and the amplitude of individual power oscillations from each of the plurality of wind turbine power systems further comprises:
determining a turbine-level imbalance of each of the plurality of wind turbine power systems based on measuring tower side-to-side accelerations or by measuring turbine-level power oscillations, each of the turbine-level imbalances defining a magnitude and a phase thereof.

Clause 18. The system of clause 17, wherein determining the farm-level power oscillation for the wind farm based on the individual power oscillations from each of the plurality of wind turbine power systems further comprises:
calculating a cumulative farm-level imbalance for the wind farm as a function of the turbine-level imbalances from each of the plurality of wind turbine power systems.

Clause 19. The system of clause 18, wherein determining the farm-level power oscillation for the wind farm based on the individual power oscillations from each of the plurality of wind turbine power systems further comprises:
identifying a subset of the plurality of wind turbine power systems contributing a percentage of the cumulative farm-level imbalance above a certain threshold;
determining which of the subset of the plurality of wind turbine power systems need a phase shift to reduce the farm-level power oscillation; and,
applying the phase shift one at a time to the subset of the plurality of wind turbine power systems; and
recalculating the farm-level power oscillation for the wind farm between each phase shift.

Clause 20. The system of clause 19, wherein the phase-shifting control scheme comprises:
altering operation of a subset of the plurality of wind turbine power systems when the phases of the power oscillations of a certain percentage of the plurality of wind turbine power systems are equal; and,
maintaining operation of the plurality of wind turbine power systems as-is when the phases of the power oscillations from each of the plurality of wind turbine power systems varies by a certain amount across the wind farm.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind farm having a plurality of wind turbine power systems electrically connected to an electrical grid through a point of interconnection, the method comprising:
   (a) determining, via a controller of the wind farm, a phase and an amplitude of individual power oscillations from each of the plurality of wind turbine power systems;
   (b) determining, via the controller, a farm-level power oscillation for the wind farm based on the individual power oscillations from each of the plurality of wind turbine power systems; and,
   (c) implementing, via the controller, a phase-shifting control scheme using the phases and the amplitudes of the individual power oscillations from each of the plurality of wind turbine power systems so as to maintain the farm-level power oscillation below a predetermined oscillation threshold, the phase-shifting control scheme comprising:
      altering operation of a subset of the plurality of wind turbine power systems when the phases of the power oscillations of a certain percentage of the plurality of wind turbine power systems are equal; and
      maintaining operation of the plurality of wind turbine power systems as-is when the phases of the power oscillations from each of the plurality of wind turbine power systems varies by a certain amount across the wind farm.

2. The method of claim 1, wherein determining the phase and the amplitude of individual power oscillations from each of the plurality of wind turbine power systems further comprises:
   determining a turbine-level imbalance of each of the plurality of wind turbine power systems based on measuring at least one of tower side-to-side accelerations or by measuring turbine-level power oscillations, each of the turbine-level imbalances defining a magnitude and a phase thereof.

3. The method of claim 2, wherein determining the farm-level power oscillation for the wind farm based on the individual power oscillations from each of the plurality of wind turbine power systems further comprises:
   calculating a cumulative farm-level imbalance for the wind farm as a function of the turbine-level imbalances from each of the plurality of wind turbine power systems.

4. The method of claim 3, wherein determining the farm-level power oscillation for the wind farm based on the individual power oscillations from each of the plurality of wind turbine power systems further comprises:
   identifying a subset of the plurality of wind turbine power systems contributing a percentage of the cumulative farm-level imbalance above a certain threshold;
   determining which of the wind turbine power systems of the subset of the plurality of wind turbine power systems need a phase shift to reduce the farm-level power oscillation; and,
   applying the phase shift one at a time to the determined wind turbine power systems of the subset of the plurality of wind turbine power systems.

5. The method of claim 4, wherein identifying the subset of the plurality of wind turbine power systems contributing the percentage of the farm-level power oscillation above the certain threshold further comprises:
   performing a vector addition of the farm-level imbalance and the turbine-level imbalances, wherein a resulting vector magnitude indicates wind turbines in the subset contributing the percentage of the cumulative farm-level imbalance above the certain threshold.

6. The method of claim 4, further comprising recalculating the farm-level power oscillation for the wind farm between each phase shift.

7. The method of claim 4, wherein the phase shift is opposite of a phase of a resulting imbalance of the plurality of wind turbine power systems.

8. The method of claim 1, wherein altering operation of the subset of the plurality of wind turbine power systems when the phases of the power oscillations of the certain percentage of the plurality of wind turbine power systems are equal further comprises:
   changing a rated speed of the subset of the plurality of wind turbine power systems until the phase shifts have been achieved.

9. The method of claim 8, further comprising verifying the phase shifts by relating the phase of individual power oscillations from each of the plurality of wind turbine power systems to the farm-level power oscillation.

10. The method of claim 1, wherein determining the phase and the amplitude of individual power oscillations from each of the plurality of wind turbine power systems further comprises:
    filtering a power signal from each of the plurality of wind turbine power systems; and, using curve fits on the filtered power signals to determine the phase and the amplitude of individual power oscillations.

11. The method of claim 1, wherein determining the phase and the amplitude of individual power oscillations from each of the plurality of wind turbine power systems further comprises:
    filtering a power signal from each of the plurality of wind turbine power systems; and, using phase lock loops (PLLs) on the filtered power signals to determine the phase and the amplitude of individual power oscillations.

12. The method of claim 1, further comprising determining the phase and the amplitude of each of the power oscillations from each of the plurality of wind turbine power systems after each of the plurality of wind turbine power systems reaches rated speed.

13. The method of claim 1, wherein the individual power oscillations comprise low-frequency power oscillations.

14. The method of claim 1, further comprising repeating (a) through (c) periodically or continuously.

15. A system for controlling a wind farm having a plurality of wind turbines electrically connected to an electrical grid through a point of interconnection, the system comprising:

a plurality of turbine controllers for controlling a plurality of wind turbine power systems, respectively, of the wind farm; and, a farm-level controller communicatively coupled to the plurality of turbine controllers for controlling the wind farm, the farm-level controller comprising at least one processor for implementing a plurality of operations, the plurality of operations comprising:

once each of the plurality of wind turbine power systems reaches rated speed, determining a phase and an amplitude of individual power oscillations from each of the plurality of wind turbine power systems;

determining a farm-level power oscillation for the wind farm based on the individual power oscillations from each of the plurality of wind turbine power systems; and, implementing a phase-shifting control scheme using the phases and the amplitudes of the individual power oscillations from each of the plurality of wind turbine power systems so as to maintain the farm-level power oscillation below a predetermined oscillation threshold, the phase-shifting control scheme comprising:

altering operation of a subset of the plurality of wind turbine power systems when the phases of the power oscillations of a certain percentage of the plurality of wind turbine power systems are equal; and maintaining operation of the plurality of wind turbine power systems as-is when the phases of the power oscillations from each of the plurality of wind turbine power systems varies by a certain amount across the wind farm.

16. The system of claim 15, wherein determining the phase and the amplitude of individual power oscillations from each of the plurality of wind turbine power systems further comprises:

determining a turbine-level imbalance of each of the plurality of wind turbine power systems based on measuring tower side-to-side accelerations or by measuring turbine-level power oscillations, each of the turbine-level imbalances defining a magnitude and a phase thereof.

17. The system of claim 16, wherein determining the farm-level power oscillation for the wind farm based on the individual power oscillations from each of the plurality of wind turbine power systems further comprises:

calculating a cumulative farm-level imbalance for the wind farm as a function of the turbine-level imbalances from each of the plurality of wind turbine power systems.

18. The system of claim 17, wherein determining the farm-level power oscillation for the wind farm based on the individual power oscillations from each of the plurality of wind turbine power systems further comprises:

identifying a subset of the plurality of wind turbine power systems contributing a percentage of the cumulative farm-level imbalance above a certain threshold;

determining which of the wind turbine power systems of the subset of the plurality of wind turbine power systems need a phase shift to reduce the farm-level power oscillation; and, applying the phase shift one at a time to the determined wind turbine power systems of the subset of the plurality of wind turbine power systems; and recalculating the farm-level power oscillation for the wind farm between each phase shift.

19. A system for controlling a wind farm having a plurality of wind turbines electrically connected to an electrical grid through a point of interconnection, the system comprising:

a plurality of turbine controllers for controlling a plurality of wind turbine power systems, respectively, of the wind farm; and, a farm-level controller communicatively coupled to the plurality of turbine controllers for controlling the wind farm, the farm-level controller comprising at least one processor for implementing a plurality of operations, the plurality of operations comprising:

once each of the plurality of wind turbine power systems reaches rated speed, determining a phase and an amplitude of individual power oscillations from each of the plurality of wind turbine power systems;

determining a farm-level power oscillation for the wind farm based on the individual power oscillations from each of the plurality of wind turbine power systems; and, implementing a phase-shifting control scheme using the phases and the amplitudes of the individual power oscillations from each of the plurality of wind turbine power systems so as to maintain the farm-level power oscillation below a predetermined oscillation threshold, wherein determining the phase and the amplitude of individual power oscillations from each of the plurality of wind turbine power systems further comprises:

determining a turbine-level imbalance of each of the plurality of wind turbine power systems based on measuring tower side-to-side accelerations or by measuring turbine-level power oscillations, each of the turbine-level imbalances defining a magnitude and a phase thereof, wherein determining the farm-level power oscillation for the wind farm based on the individual power oscillations from each of the plurality of wind turbine power systems further comprises:

calculating a cumulative farm-level imbalance for the wind farm as a function of the turbine-level imbalances from each of the plurality of wind turbine power systems, wherein determining the farm-level power oscillation for the wind farm based on the individual power oscillations from each of the plurality of wind turbine power systems further comprises:

identifying a subset of the plurality of wind turbine power systems contributing a percentage of the cumulative farm-level imbalance above a certain threshold;

determining which of the wind turbine power systems of the subset of the plurality of wind turbine power systems need a phase shift to reduce the farm-level power oscillation; and, applying the phase shift one at a time to the determined wind turbine power systems of the subset of the plurality of wind turbine power systems.

20. The system of claim 19, wherein identifying the subset of the plurality of wind turbine power systems contributing the percentage of the farm-level power oscillation above the certain threshold further comprises:

performing a vector addition of the farm-level imbalance and the turbine-level imbalances, wherein a resulting vector magnitude indicates wind turbines in the subset contributing the percentage of the cumulative farm-level imbalance above the certain threshold.

\* \* \* \* \*